United States Patent
LeCorney (10) Patent No.: US 6,674,719 B1
(45) Date of Patent: Jan. 6, 2004

(54) QUOTIENT ALGORITHM IN MONITORING DISTURBANCE PROCESSES

(75) Inventor: David LeCorney, Valutavägen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/271,885

(22) Filed: Mar. 18, 1999

(30) Foreign Application Priority Data

Mar. 25, 1998 (SE) ............................................... 9801009

(51) Int. Cl.⁷ ........................ H04L 12/24; H04L 12/26; G06F 11/00
(52) U.S. Cl. ........................ 370/235; 370/242; 370/252
(58) Field of Search ............................... 370/230, 230.1, 370/231–235, 235.1, 236, 252, 242–244; 709/223; 714/703, 704

(56) References Cited

U.S. PATENT DOCUMENTS

| | | | | |
|---|---|---|---|---|
| 5,042,027 A | * | 8/1991 | Takase et al. ................ 370/252 |
| 5,337,195 A | | 8/1994 | Ito et al. | |
| 5,343,465 A | * | 8/1994 | Khalil ......................... 370/232 |
| 5,423,003 A | * | 6/1995 | Berteau ....................... 370/254 |
| 5,487,072 A | * | 1/1996 | Kant ........................... 714/748 |
| 5,563,874 A | * | 10/1996 | Kant ........................... 370/252 |
| 5,629,927 A | | 5/1997 | Waclawsky et al. | |
| 5,719,480 A | * | 2/1998 | Bock et al. .............. 318/568.11 |
| 5,737,313 A | * | 4/1998 | Kolarov et al. .............. 370/234 |
| 5,757,776 A | * | 5/1998 | Ellebracht et al. ........... 370/244 |
| 5,774,456 A | * | 6/1998 | Ellebracht et al. ........... 370/242 |
| 5,793,976 A | * | 8/1998 | Chen et al. .................. 709/224 |
| 6,175,554 B1 | * | 1/2001 | Jang et al. ................... 370/229 |
| 6,421,323 B1 | * | 7/2002 | Nelson et al. ............... 370/249 |
| 6,442,135 B1 | * | 8/2002 | Ofek ........................... 370/229 |

FOREIGN PATENT DOCUMENTS

WO    97 12323 A1    4/1997

* cited by examiner

Primary Examiner—Chau Nguyen
Assistant Examiner—Soon-Dong Hyun (57) ABSTRACT

The Quotient algorithm is used for controlling the monitoring of disturbances in a physical process and disturbance-counting values acquired in the monitoring are utilized to determine a disturbance frequency and a peakedness value for the disturbance process. The peakedness value is used as a measure of the bursty behavior of the disturbances. The disturbance frequency and the peakedness value determined from the acquired disturbance-counting values are utilized in calculating more refined thresholds for the algorithm, and the thresholds initially set for the Quotient algorithm are replaced by these more refined thresholds, thus improving the performance and quality of the disturbance monitoring.

22 Claims, 6 Drawing Sheets

QUOTIENT ALGORITHM IN MONITORING DISTURBANCE PROCESSES

The present invention generally relates to supervision or monitoring of disturbances in physical processes.

BACKGROUND

As a specific field in this regard performance management according to TMN (Telecommunications Management Networks) standards of telecommunication operations can be mentioned, cf. ITU-T Recommendation M.3400.

In the specific field of telecommunications and telecommunication systems, there are many examples of disturbances, such as parity errors, sporadic hardware faults, bit-correction errors, cyclic-redundancy-check (CRC) errors, congested call attempts, synchronization slips, protocol errors, signaling errors in line or register signaling, program exceptions during run-time, and violations of the software contract at an interface.

There are also many cases of disturbances in processes outside the field of telecommunications, such as errors appearing when making a copy on a photocopier, false results in a blood test, production faults in the manufacture of an electronic component or a printed-circuit board.

All such disturbances are unavoidable, and there is no reason to intervene for a single disturbance in order to find its cause. However, it is necessary to monitor automatically the disturbance rate, normally referred to as the disturbance frequency. If the disturbance frequency remains at a relatively low predictable level, this can be accepted. But if the rate of disturbances rises to an unacceptable level, then the monitoring mechanism must raise an alarm, or send a notification, requesting manual intervention to find the cause of the excess disturbances.

Currently, the expression Quality-Of-Service (QOS) measurement is used, as part of the performance management specified by TMN standards. QOS measurements are well specified by standards, cf. for example, ITU-T G.821 on #7 signaling, concerning error rates.

In monitoring disturbances in physical processes, there are a number of different algorithms that can be used in the QOS measurements. Such a QOS algorithm generally includes a number of so-called threshold parameters, the values of which must be selected before the algorithm can be put into operation. Examples of algorithms used in QOS measurements are the so-called Leaky Bucket algorithm and the Quotient algorithm. The Quotient algorithm as well as the Leaky Bucket algorithm are potentially well usable algorithms for QOS measurements.

Figure 1:
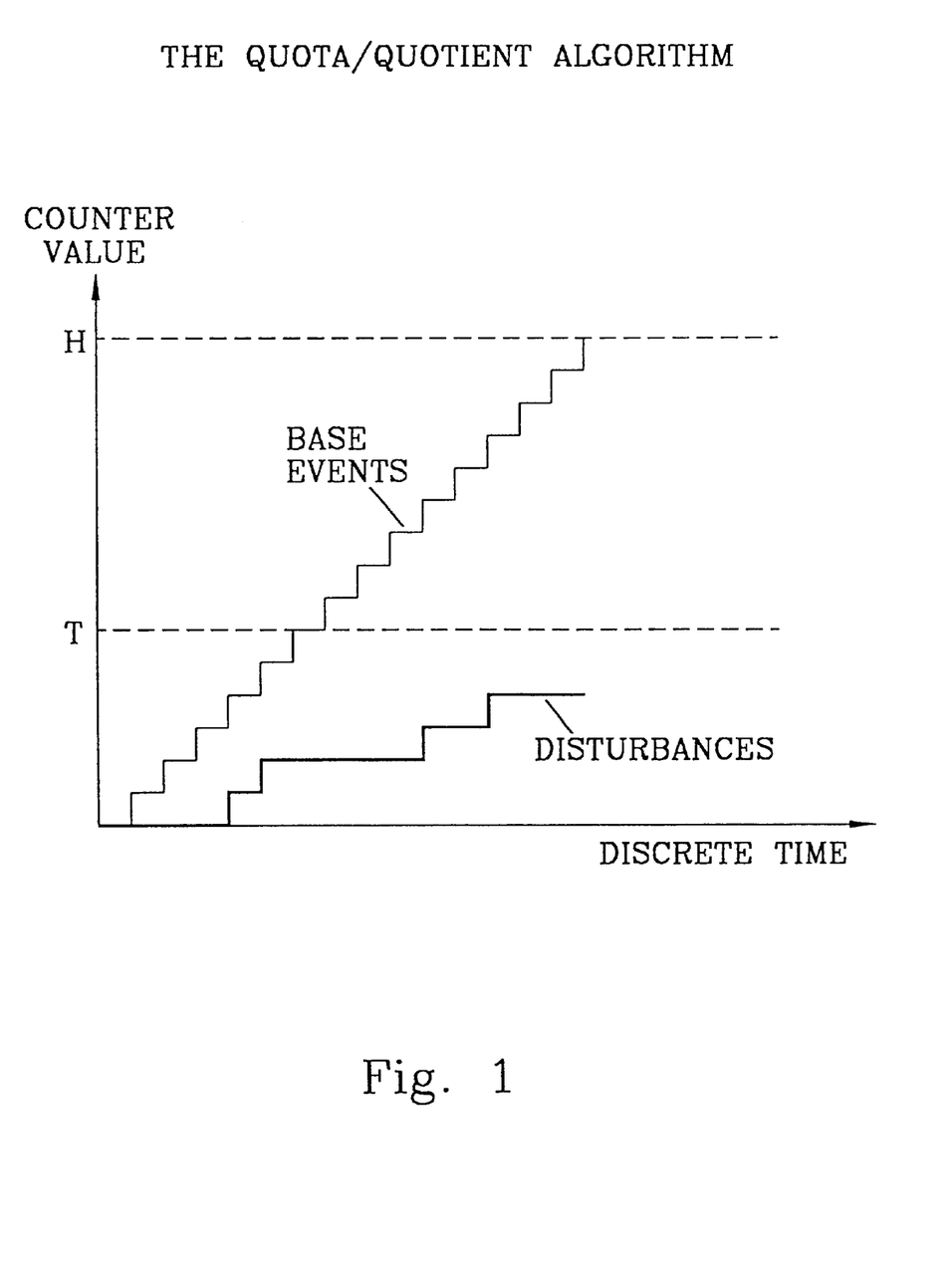
FIG. 1 is a schematic diagram illustrating the counter values of the counters used by the Quotient algorithm.

For a better understanding of the problems related to setting thresholds for QOS algorithms, the Quotient algorithm will now be briefly described with reference to FIG. 1. The Quotient algorithm, also referred to as the Quota algorithm, makes use of two counters, a first counter for base events and a second counter for disturbances. FIG. 1 is a schematic diagram illustrating the counter values of the counters used by the Quotient algorithm. The first so-called base-event counter increments by one for each base event. The second so-called disturbance counter increments by one for each disturbance. Two thresholds are specified, one for each counter. The threshold for the base-event counter is designated H, and the threshold for the disturbance counter is designated T. The thresholds are set in such a way that the base-event counter normally reaches its threshold first. However, for very high disturbance frequencies, the disturbance counter should reach its threshold first such that an alarm can be given or a notification sent. In other words, if the base-event counter reaches its threshold H first, before the disturbance counter reaches T, the disturbance frequency is assumed to be at an acceptable level. If the disturbance counter reaches its threshold T first, before the base-event counter reaches H, then it is assumed that the disturbance frequency is too high.

The setting of the thresholds for the Quotient algorithm is obviously critical for the overall operation of the algorithm. In the prior art, thresholds for QOS algorithms, such as the Quotient algorithm, have been selected in a more or less arbitrary manner. There have been no satisfactory guidelines on how to set the threshold parameters in a systematic way so as to obtain meaningful results.

In practice, threshold parameters for QOS algorithms are set empirically based on judgment and experience, and often, the results from QOS measurements are so unreliable that they are worse than useless. They give false results, and can be such an irritant to maintenance personnel that the monitoring of the disturbances are turned off.

U.S. Pat. No. 5,377,195 illustrates a specific form of disturbance monitoring in which the Leaky Bucket algorithm is utilized.

U.S. Pat. No. 5,629,927 discloses a system and method for monitoring and controlling ATM networks. Selected ranges of contiguous non-empty cells and of contiguous empty cells are monitored, and corresponding count values are outputted. The count values are analyzed and control signals used for reordering or changing the time of transmission of data are generated. For the count values of non-empty cells and empty cells, a respective threshold is used for distinguishing a desirable operative region from a control region.

The Patent Publication WO 97/12323 relates to in-service performance monitoring of high-speed synchronous digital telecommunications signals. More particularly, WO 97/12323 discloses a method and apparatus for generating and clearing an excessive bit-error-rate alarm by using a time-window technique.

SUMMARY

The present invention overcomes these and other drawbacks of the prior art arrangements.

It is a general object of the invention to improve the performance and quality of the monitoring of disturbances in physical processes.

Another object of the invention is to find a rigorous and systematic method for setting threshold values for algorithms that control the monitoring of disturbances in physical processes.

It is also an object of the invention to fully utilize the information of the physical disturbance process that can be obtained from QOS measurements controlled by the Quotient algorithm.

Yet another object of the invention is to provide a system for monitoring disturbances in a physical process using the Quotient algorithm, where the thresholds for the Quotient algorithm are adjusted in a systematic and efficient manner, so as to obtain meaningful and satisfactory results of the QOS measurements.

These and other objects are met by the invention as defined by the accompanying claims.

In accordance with a preferred embodiment of the invention, the Quotient algorithm is used for controlling the monitoring of disturbances in a physical process and disturbance-counting values acquired in the monitoring are utilized to determine a disturbance frequency and a peakedness value for the disturbance process. The peakedness value is used as a measure of the bursty behavior of the disturbances. The disturbance frequency and the peakedness value determined from the acquired disturbance-counting values are utilized in calculating more refined thresholds for the algorithm. The thresholds initially set for the Quotient algorithm are replaced by these more refined thresholds, thus improving the performance and quality of the disturbance monitoring.

In practice, disturbances do not generally occur purely at random but in bursts. It is thus necessary that the bursty behavior of the disturbances in the physical process is treated correctly. According to an essential feature of the invention, a peakedness hypothesis is defined stating that sufficient information about the bursty behavior of the disturbance process is comprised within the value of the peakedness factor together with the disturbance frequency.

The peakedness factor is defined by ITU-T to be the ratio of the variance to the mean of a random variable. The general idea according to the invention is to utilize an inherent feature of the Quotient algorithm itself to find a random variable of interest for determining a value of the peakedness factor for the disturbance process. The peakedness factor for the disturbance process is defined as the ratio of the variance to the mean of occurrences of disturbances in the physical process. According to a preferred embodiment of the invention, a single QOS measurement is called a "measurement period" and is defined as the time taken for the base-event counter to reach its threshold. The value of the disturbance counter at the end of the measurement period is a random variable referred to as a disturbance-counting value, and this random variable is used in determining the value of the peakedness factor for the disturbance process.

The mathematical framework which makes it possible to determine the peakedness factor of the disturbance process is primarily based on the assumption that the disturbance-counting values at the end of the predetermined measurement periods are Pi-distributed. The Pi-distribution of the disturbance-counting values has a certain peakedness, which can be calculated by using an averaging algorithm such as the moving-geometric-mean algorithm or the sliding-window algorithm.

In particular, the moving-geometric-mean algorithm is suitable for processing the disturbance-counting values to determine the peakedness as well as the disturbance frequency of the disturbance process.

It should be understood that the disturbance frequency and the peakedness value relate to the disturbances of the physical process and not to the particular algorithm that controls the monitoring of the disturbances. Consequently, the disturbance frequency and the peakedness value determined by using the Quotient algorithm can be used to set the parameters for other monitoring algorithms, such as the Leaky Bucket algorithm.

The invention offers the following advantages:

improved monitoring performance;

an efficient and systematic approach to find thresholds for monitoring algorithms so as to obtain meaningful results; and efficient utilization of the information obtained from QOS measurements controlled by the Quotient algorithm.

Other advantages offered by the present invention will be appreciated upon reading of the below description of the embodiments of the invention.

BRIEF DESCRIPTION OF THE DRAWINGS

The novel features believed characteristic of the invention are set forth in the appended claims. The invention itself, however, as well as other features and advantages thereof will be best understood by reference to the detailed description of the specific embodiments which follows, when read in conjunction with the accompanying drawings, wherein:

DETAILED DESCRIPTION

The invention relates to an algorithm-controlled supervision or monitoring of disturbances in physical processes. Errors or disturbances occur in virtually every industrial process known to man. All such disturbances are normally unavoidable, and there is no reason to intervene for a single disturbance in order to find its cause. However, it is necessary to monitor the disturbance frequency of the process, and if the rate of disturbances rises to an unacceptable level, an alarm must be raised or a notification sent.

System Orientation

Figure 2:
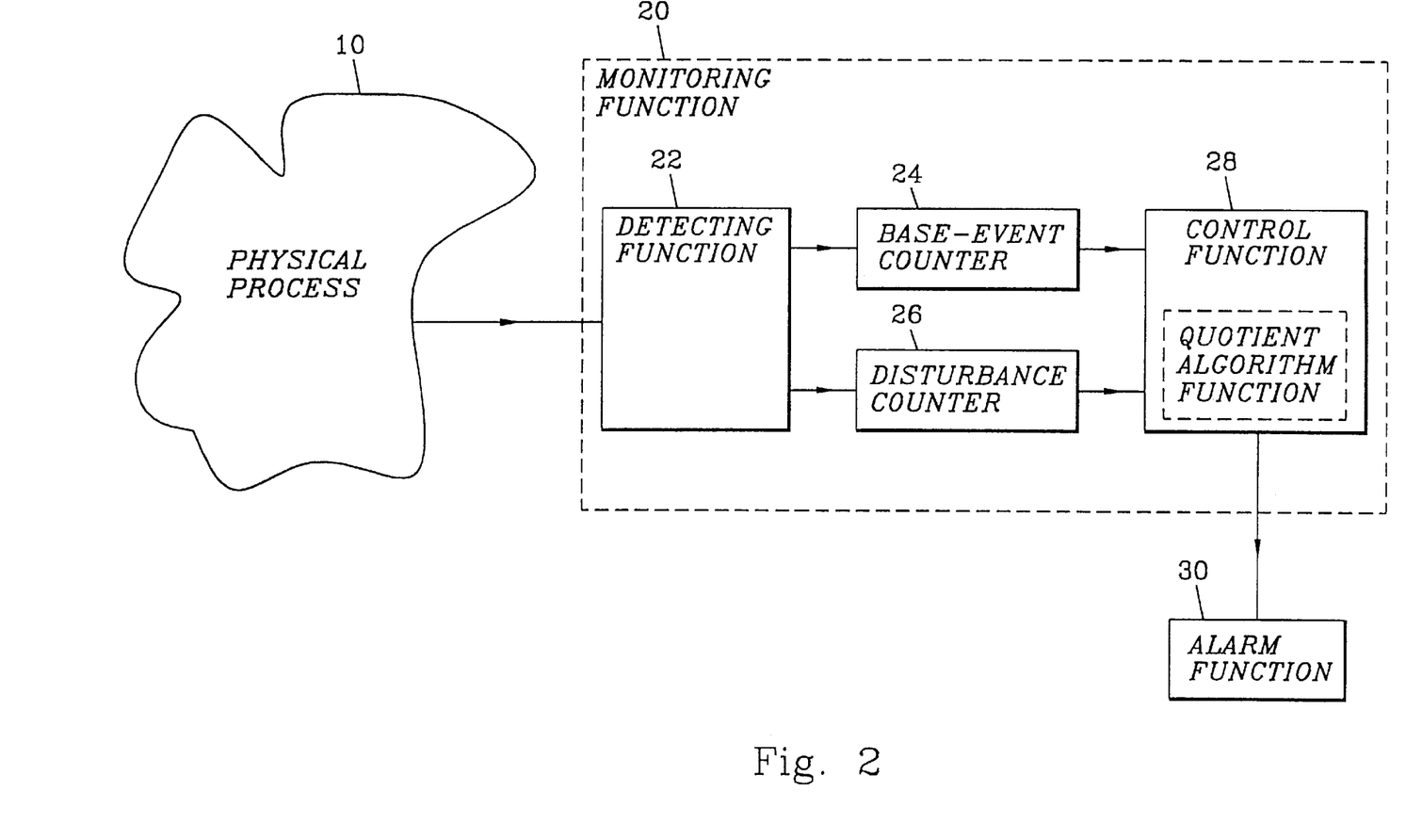
FIG. 2 is a schematic diagram of the interrelationship between a physical process and the functions for monitoring the disturbances of the process, and alarm functions.

FIG. 2 is a schematic diagram of the interrelationship between a physical process 10 and the functions 20 for monitoring the disturbances of the process, and alarm functions 30. The monitoring function 20 generally comprises a detecting function 22 implemented by conventional software and/or hardware, a base-event counter 24, a disturbance counter 26 and a control function 28 implementing the algorithm function. The algorithm for controlling the monitoring of the disturbances will generally be the Quotient algorithm unless otherwise stated.

In general, the considered physical process 10 is a complex industrial process such as a manufacturing process or a process performed by a communication switch or a digital computer. On the other hand, the physical process may be the process of making a copy on a photocopier or the analysis of a blood test.

The detecting function 22 acts as an interface between the physical process 10 and the monitoring function 20, and detects base events and disturbances in the physical process. Of course, it is necessary to define the anomalous or abnormal event that is regarded to be a disturbance, as well as the base against which the disturbances are to be counted. For each detected base event, the detecting function 22 increments the base-event counter 24. For each detected disturbance, the detecting function 22 increments the disturbance counter 26. In this example, it should be understood that since the outcome of a base event may be a normal event or a disturbance, the base-event counter is incremented for each detected normal event and also for each detected disturbance. FIG. 1, previously described, illustrates an example of how the counter values of a base-event counter and a disturbance counter are incremented over time. The counter values of the base-event counter 24 and the disturbance counter 26 are fed to and analyzed by the control function 28. In the Quotient algorithm function of the control function 28, two thresholds are specified, one for each counter. Throughout the disclosure, the threshold for the base-event counter 24 will be designated H, and the threshold for the disturbance counter 26 will be designated T. The thresholds are set in such a way that the base-event counter 24 normally reaches its threshold H first. However, for unacceptably high disturbance frequencies, the disturbance counter 26 should reach its threshold T first such that the control function 28 can instruct the alarm function 30 to raise an alarm or give a notification.

The description of the Quotient algorithm can be likened to the old fable about the hare and the tortoise, where the hare is the base-event counter 24 and the tortoise is the disturbance counter 26. So, if the hare wins the race by reaching its threshold H first, the disturbance frequency is assumed to be at an acceptable level, whereas if the tortoise wins the race by reaching its threshold T first, the disturbance frequency is assumed to be too high.

First Preferred Embodiment

Figure 3:
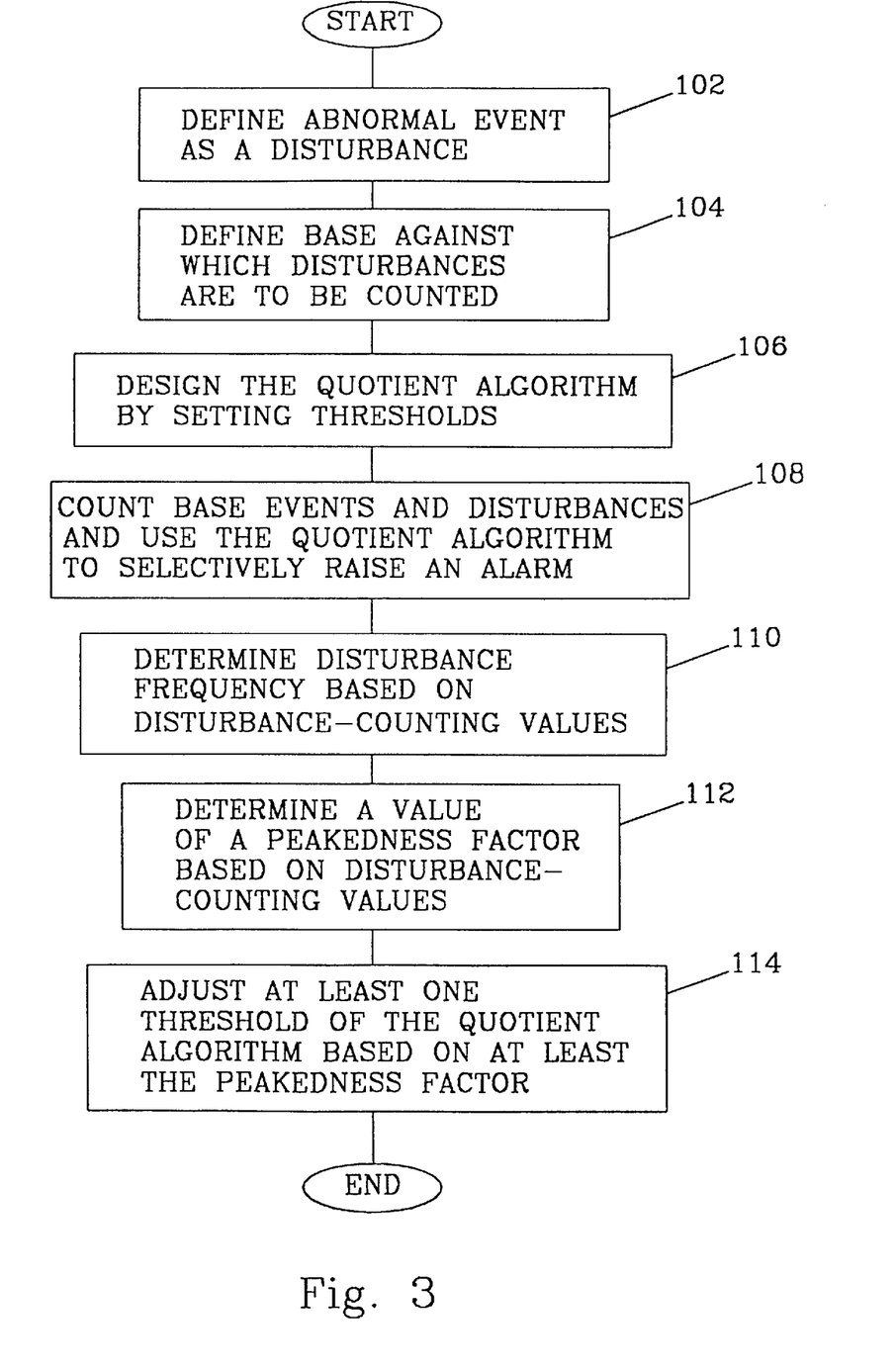
FIG. 3 is a schematic flow diagram of a first preferred embodiment of a method for performing monitoring of disturbances in a physical process.

A first preferred embodiment of the invention will now be described with reference to the flow diagram of FIG. 3. FIG. 3 is a schematic flow diagram of a first preferred embodiment of a method for performing monitoring of disturbances in a physical process. A first step 102 is to define the abnormal event that is regarded to be a disturbance, e.g. a bit error or a congested call attempt. A preferred way of performing this step is described in U.S. Pat. No. 5,377,195 referred to earlier. The next step, indicated at 104, is to define a base against which the disturbances are to be counted. In step 106, the Quotient algorithm is designed by setting a base-event threshold H and a disturbance threshold T. At this stage, it is normally sufficient to make an a priori guess or estimate of the thresholds based on experience and intuition. Next, in step 108, the disturbances of the physical process are monitored by counting base events, counting disturbances and using the Quotient algorithm to selectively raise an alarm. In step 110, at least one value f of the disturbance frequency of the physical process is determined based on disturbance-counting values acquired in the monitoring. In step 112, a value F of a peakedness factor defined as the ratio of the variance to the mean of occurrences of disturbances is determined, at the disturbance frequency f, based on disturbance-counting values acquired in the monitoring. Peakedness is here used as a measure of how bursty the disturbances are. In step 114, at least one threshold of the Quotient algorithm is adjusted based on at least the determined peakedness value F.

Normally, the steps 110 and 112 are performed while the overall monitoring continues. Also, the steps 110, 112 and 114 may be repeated during the monitoring.

Although it is possible to adjust only one of the thresholds of the Quotient algorithm, the normal procedure is to adjust both thresholds. For better performance, both the disturbance frequency f and the peakedness value F determined from the acquired disturbance-counting values are utilized in calculating more refined thresholds for the Quotient algorithm, and the thresholds initially set for the Quotient algorithm are then replaced by these more refined thresholds.

In general, disturbances do not occur purely at random. In most disturbance processes, disturbances occur in bursts. It is thus necessary that the bursty behavior of the disturbances in the physical process is treated correctly. A "burst" is generally a sequence of base events in which many disturbances occur. In a burst, the disturbances do not have to be consecutive, but may be interspersed with normal base events.

According to an essential feature of the invention, a peakedness hypothesis is used which states that sufficient information about the bursty behavior of the disturbance process is comprised within the value of the peakedness factor together with the disturbance frequency. In fact, it is believed that peakedness is currently the best measure of how bursty the disturbances in the physical process are, and contains all relevant information about the bursty behavior of the disturbance process. It is of course unlikely that the peakedness hypothesis is 100% valid in all circumstances. However, for all practical purposes, evidence implies that the peakedness hypothesis actually is valid.

The peakedness factor, also referred to as peakedness, is defined by ITU-T, cf. CCITT, Handbook on Quality of Service and Network Performance, Geneva, 1993, ISBN 92-61-04741-6, Rec. E.600, to be the ratio of the variance to the mean of traffic. Although, the peakedness factor was originally defined to describe arrivals of traffic in teletraffic theory, it has been appreciated that peakedness applies equally well to the study of disturbances. The peakedness factor for the disturbance process is naturally defined as the ratio of the variance to the mean of occurrences of disturbances in the physical process. It should be understood that the peakedness factor defined herein has nothing to do with the notion of a "peak value".

Once the peakedness hypothesis has been set out, the general idea according to the invention is to utilize an inherent feature of the Quotient algorithm itself to define a random variable of interest for determining a value of the peakedness factor for the disturbance process. The Quotient algorithm is designed to explicitly count disturbances in a predetermined period. Based on this feature of the Quotient algorithm, the random variable used in determining the peakedness factor is defined as the value of the disturbance counter 26 at the end of the predetermined period.

According to a preferred embodiment of the invention, a single QOS measurement is called a "measurement period" and is defined as the time taken for the base-event counter 24 (FIG. 2) to reach its threshold. The value of the disturbance counter 26 (FIG. 2) at the end of the predetermined measurement period is a random variable referred to as a disturbance-counting value. During monitoring, a set of QOS measurements are performed, and the disturbance-counting values acquired from the QOS measurements are used in determining the value of the peakedness factor for the disturbance process.

The mathematical framework which makes it possible to determine the peakedness factor of the disturbance process is primarily based on the assumption that the disturbance-counting values are Pi-distributed. The Pi-distribution is believed to be the class of distributions that describe the behavior of the disturbance-counting values. The name "Pi" has been chosen from the Greek alphabet to reflect the peakedness in the distribution, and it should be understood that there is no relationship to the universal constant pi=3.141.... The Pi-distribution of the disturbance-counting values has a certain peakedness, which can be calculated by using an averaging algorithm such as the sliding-window algorithm or the moving-geometric-mean algorithm, also referred to as the exponentially weighted moving average algorithm. The technique of averaging the disturbance-counting values acquired in a set of QOS measurements is performed according to standard practice and will be described in more detail below. Averaging algorithms such as the weighted moving average algorithm are described, for example in the article "Flow Enforcement Algorithms for ATM Networks" by Moth et al., Technical University of Denmark.

For a better understanding of the invention, it might be useful to briefly discuss the concepts of random variable, peakedness and probability distribution in somewhat more mathematical terms:

Let the random variable X represent the number of disturbances registered in H base events, i.e. in a predetermined measurement period, in a disturbance process with disturbance frequency f. In general, the ratio of the variance to the mean of the random variable X in such a process is a constant, called the peakedness factor F, which is independent of the length, H, of the measurement period. Of particular interest is the case where the disturbances occur in bursts. Often, the disturbance bursts themselves occur at random. In either case, the peakedness factor F>1. On the other hand, if the disturbances are isolated, but occur periodically then the peakedness factor F<1.

Figure 4:
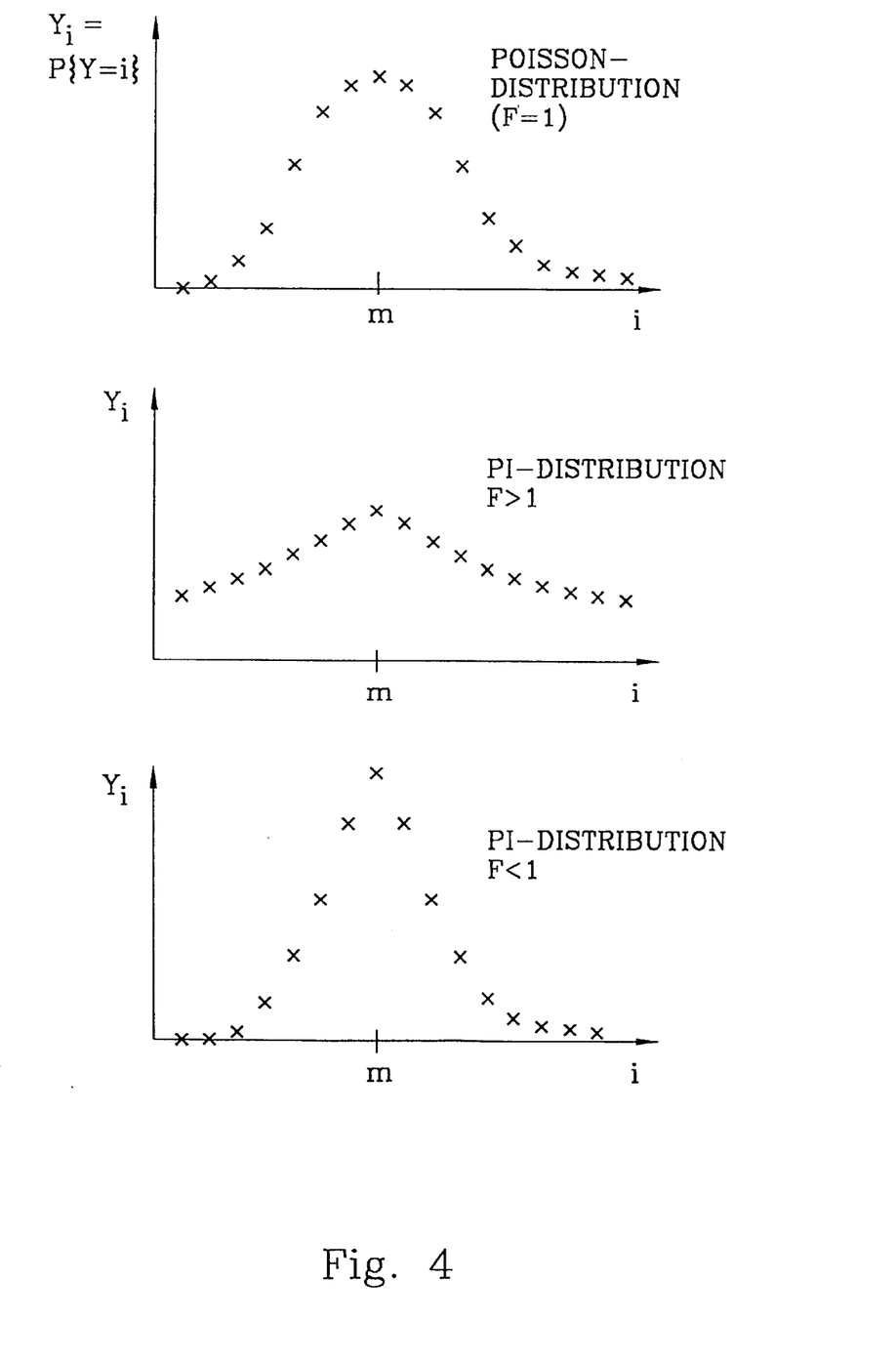
FIG. 4 schematically illustrates a Poisson-distribution, a Pi-distribution with peakedness F>1 and a Pi-distribution with F<1.

Given that the peakedness hypothesis is valid, what is the probability distribution of the random variable X? If the disturbances of the physical process occur at random, i.e. uncorrelated disturbances, then the number of disturbances in H base events are Poisson-distributed, and the disturbance process is a "Poisson process". However in many disturbance processes, the disturbances occur in bursts. For this reason, the Pi-distribution, rather than the normal Poisson-distribution, is believed to be the class of distributions that describe the behavior of the random variable X. The two essential parameters for a Pi-distribution are the mean m and the peakedness F. Qualitatively at least, the Pi-distribution resembles a Poisson-distribution that has been "flattened out" if F>1, or "squeezed together" if F<1, both around the same mean, m. FIG. 4 schematically illustrates a Poisson-distribution at the top (the Poisson-distribution can be said to be a Pi-distribution with F=1), a Pi-distribution with F>1 in the middle and a Pi-distribution with F<1 at the bottom.

It should be understood that mathematical framework defined above covers the case when the disturbances occur in bursts, but also the case when the disturbances occur at random, and combinations of the two cases.

Second Preferred Embodiment

Figure 5:
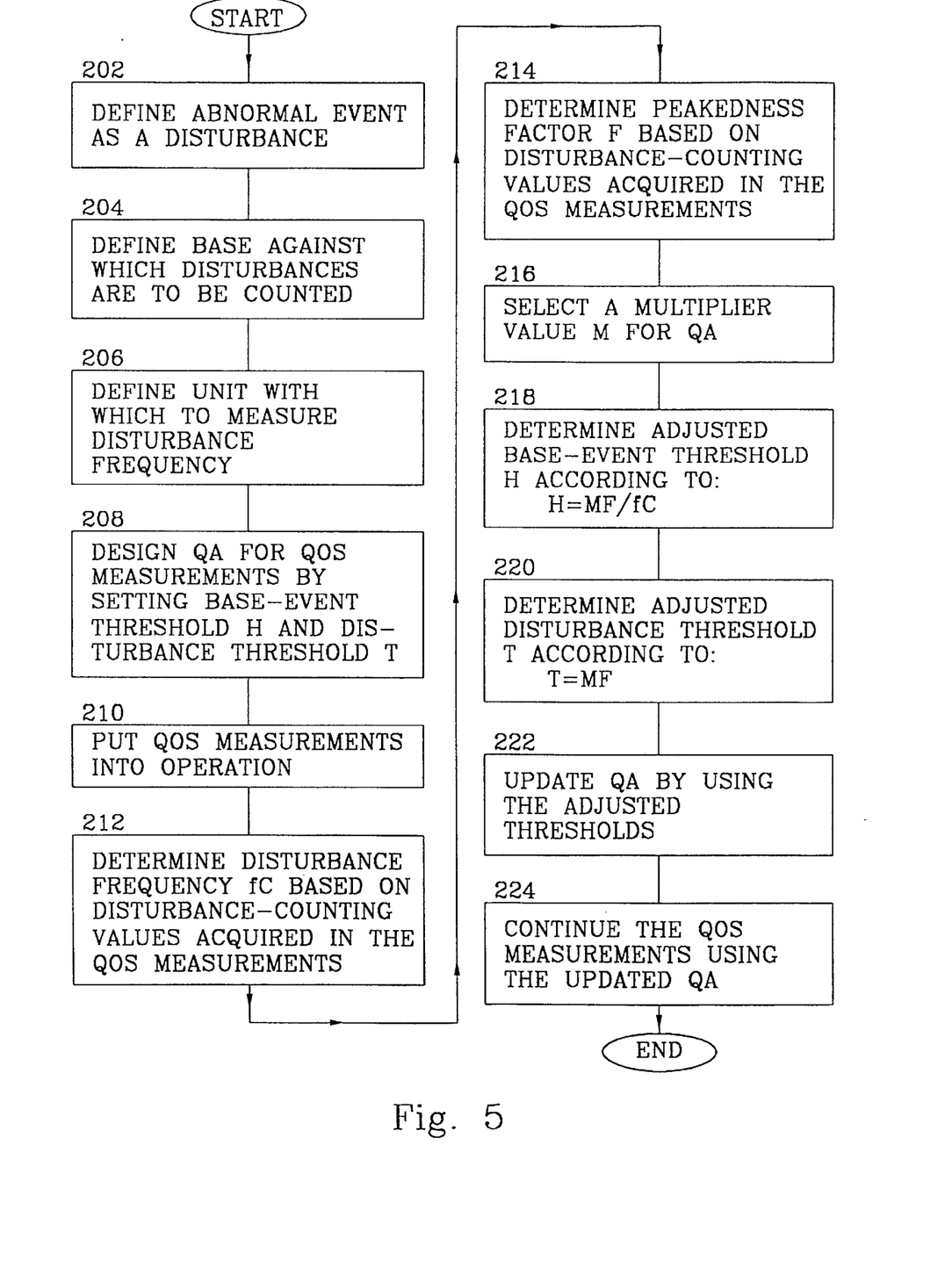
FIG. 5 is a schematic flow diagram of a second preferred embodiment of a method for performing monitoring of disturbances in a physical process.

Now, the invention will be described in more detail with reference to FIG. 5. FIG. 5 is a schematic flow diagram of a second preferred embodiment of a method for performing monitoring of disturbances in a physical process.

A first step 202 is to define an abnormal event that is regarded to be a disturbance, e.g. a bit error or a congested call attempt. This step is preferably performed as described in U.S. Pat. No. 5,377,195 referred to earlier.

The next step, indicated at 204, is to define a base against which the disturbances are to be counted. The base can be:

A unit of time, e.g. the duration of one bit.

A base event, e.g. a call attempt.

An artificial base, such as a unit of traffic-volume, e.g. an erlang-second.

In all three cases, the outcome is a random variable which can take the values 0 and 1; 0 for a normal event and 1 for a disturbance. It is a clear advantage that artificial bases can be used.

In step 206, the unit with which to measure disturbance frequency is defined. Examples are: for a time-based disturbance process, the proportion of bit errors; for an event-based disturbance process, the percentage of failed calls; and for a traffic-based disturbance process, the proportion of errored seconds during speech.

The next step, indicated at 208, is to design the Quotient algorithm (QA) for QOS measurements by setting the base-event threshold H and the disturbance threshold T. At this point, it is normally sufficient to make an a priori guess or estimate of the thresholds based on experience and intuition.

In step 210, the QOS measurements using the designed Quotient algorithm are put into operation. In other words, the actual monitoring of the disturbances is initiated, and the monitoring function (indicated at 20 in FIG. 2) counts base events and disturbances. Each QOS measurement lasts H base events as indicated by the base-event threshold H for the base-event counter (24 in FIG. 2). At the end of each QOS measurement, the counter value of the disturbance counter (26 in FIG. 2) is sent as a disturbance-counting value to a statistics block (not shown) in the control function (28 in FIG. 2) or stored in a memory in the control function 28 for later processing. The base-event counter 24 and the disturbance counter 26 are reset so as to be ready for the next QOS measurement. The disturbance-counting value is the counter value of the disturbance counter 26 when the base-event counter 24 has reached its threshold H, regardless of whether the disturbance counter 26 has passed its threshold T or not. Normally however, every time the disturbance counter 26 reaches its threshold T before the base-event counter 24 reaches its threshold H, the control function 28 will instruct the alarm function (30 in FIG. 2) to raise an alarm. It should however be understood that the alarm function 30 may be put into operation at a later time (e.g. in connection with step 222 described below) as controlled by the system manager.

The disturbance-counting values acquired from the disturbance counter 26 are analyzed by the control function 28, and in step 212 the disturbance frequency is determined based on these values. In step 214, a value of the peakedness factor F is determined based on the disturbance-counting values acquired in the QOS measurements.

Statistics

Now, a preferred way of determining the disturbance frequency and the peakedness based on the disturbance-counting values will be described. A suitable algorithm for processing the disturbance-counting values is the moving-geometric-mean algorithm described in the article "Flow Enforcement Algorithms for ATM Networks" referred to earlier. Let X(i) denote the values of the disturbance counter 26 at the end of successive QOS measurement periods. Each measurement period consists of H base events, and the number of disturbances, X(i), in a period is a Pi-distributed random variable.

a) Choose a constant c for the moving-geometric-mean algorithm. Typically 0.9<c<1.0.

b) Determine disturbance frequency:

Let Y(n) be the moving geometric mean of X(i), and calculate Y(n) iteratively using the moving-geometric-mean algorithm:

$$Y(n)=c \cdot Y(n-1)+(1-c) \cdot X(n). \qquad (1)$$

To initialize the moving-geometric-mean algorithm, it is necessary to choose an initial value Y(0). As the significance of this initial value decays exponentially over time, it is sufficient to choose a fairly arbitrary value. A suitable choice for Y(0) is an a priori estimate of the disturbance frequency, multiplied by the number H of base events in the measurement period. The best estimate f of the disturbance frequency at any point in time is therefore:

$$f = \frac{Y(n)}{H}. \qquad (2)$$

The value f of the disturbance frequency is an estimate of the current disturbance frequency of the disturbance process.

Preferably, a number of sets of QOS measurements are performed under different circumstances such that a plurality of values of the disturbance frequency in a variety of circumstances can be determined. In particular, there are five values of disturbance frequency that can be of interest:

fN=normal frequency in operation, for example 0.5%;

fR=raised frequency in operation, but one that is still acceptable, for example 0.8%;

fC=critical frequency, at which the alarm nominally is raised, for example 1.0%;

fE=excessive frequency, at which the performance of the equipment is degraded, for example 1.25%; and fU=unacceptable frequency, where there are too many disturbances for proper operation, for example 2.0%.

The value Y(n) corresponding to the critical value fC of the disturbance frequency is the best value to be used in determining the peakedness factor. The critical value fC of the disturbance frequency and the peakedness factor at this critical disturbance frequency are the most suitable for setting the thresholds of the Quotient algorithm, and will be the ones used in the following unless otherwise stated.

If the constant c is chosen close to unity, the algorithm will have a "long memory". In other words, it will take a long time for the significance of any X(i) to decay. At the same time, no particular X(i) can dominate the value of Y(n). In this case, Y(n) is the average of a large number of measurements X(i). On the other hand, if c is selected close to 0.9, Y(n) will in effect be the average of a smaller number of measurements X(i).

For efficient processing in a computer processor that lacks efficient floating-point operations, choose c to be one of 15/16, 31/32, 63/64, 127/128, etc. as multiplication by these constants can be executed fast by means of shift and subtraction operations.

c) Determine the peakedness factor:

Let Z(n) be the moving geometric mean square of X(i), and calculate Z(n) iteratively using the moving-geometric-mean algorithm:

$$Z(n) = c \cdot Z(n-1) + (1-c) \cdot (X(n))^2. \qquad (3)$$

The initial value Z(0) is the a priori estimate of the mean square of X(i), and is chosen to be $H^2 \cdot f \cdot (f+F)$, as a consequence of eq. (5) below, using a priori estimates of the disturbance frequency f and the peakedness F.

Recalling that the peakedness factor F is defined as:

$$F = \frac{\text{variance}}{\text{mean}} = \qquad (4)$$

$$\frac{(\text{mean square}) - (\text{mean squared})}{\text{mean}} == \frac{\text{mean square}}{\text{mean}} - \text{mean}.$$

It is therefore reasonable to estimate the peakedness factor F by:

$$F = \frac{1}{H} \cdot \left( \frac{Z(n)}{Y(n)} - Y(n) \right). \qquad (5)$$

Although this estimator may be biased, it is sufficient for practical purposes.

In step 216, a multiplier value M for the Quotient algorithm is introduced. The multiplier value M is used as a measure of how fast or slowly the Quotient algorithm is desired to react to changes in the disturbance frequency so as to achieve an acceptable and reasonable compromise between reliability and reactivity of the monitoring. On one hand, a small value of the multiplier means that the algorithm reacts quickly, at the price of more false results. On the other hand, a large value of the multiplier gives more reliable results, but at the price of a taking longer time.

No matter how well any QOS measurement is specified, there is always a risk of a false result. A false positive is obtained when a QOS alarm is raised, even though there is nothing wrong with the supervised object. A false negative is obtained when no alarm is raised, even though there is something wrong with the supervised object.

In general, if there are many supervised objects that are not critical to the operation of the overall system, then false positives are the problem. The operational staff get irritated by false positives, and may decide to ignore them. In that case, the thresholds for the QOS measurements must be selected to give a low risk of false positives. However, the price of this decision is that the monitoring reacts slowly when the supervised object genuinely causes too many disturbances.

On the other hand, if there are few supervised objects that are critical to the operation of the system, it is important that the QOS measurements do react quickly when the supervised objects cause too many disturbances. The price of this decision is that there will be a number of false positives.

The purpose of step 216 is to select a multiplier value M which gives a reasonable compromise between the conflicting goals of significance of results and speed at which the results are obtained.

In table I below, an arbitrary example of a risk table is presented.

TABLE I

| Disturbance frequency | Bias, b | Value | Risk of false result | Significance level, s | Multiplier, M |
| --- | --- | --- | --- | --- | --- |
| fN | −50% | 0.005 | 0.001 | −3.1 | 19.2 |
| fR | −20% | 0.008 | 0.1 | −1.3 | 33.8 |
| fC | 0 | 0.01 | — | 0 | — |
| fE | +25% | 0.0125 | 0.1 | 1.3 | 33.8 |
| fU | +100% | 0.02 | 0.001 | 3.1 | 19.2 |

The six columns of the risk table above indicate, in turn, level of disturbance frequency, bias, value of the disturbance frequency, risk of false result, level of significance and multiplier. The concept of bias is essentially the same as in U.S. Pat. No. 5,377,195 referred to earlier. Though here it means, e.g., that the value of fR is 20% less than the value of fC. The values in the columns should be regarded as an illustrative set of values for the purposes of discussion. In principle, any suitable set of values for the bias can be chosen. However, the values for the bias given in Table I are both intuitive and easy to manage. Also, there is a symmetrical behavior about fC. The values of the disturbance frequency are calculated by adjusting the critical frequency with the respective values of the bias. The values for the risks are set based on experience, judgment or intuition.

Referring to Table I. If it is assumed that the critical disturbance frequency fC is 0.01, i.e. the disturbance counter 26 reaches its threshold T first and the monitoring raises an alarm as the disturbance frequency exceeds 1%, then for a normal disturbance frequency of 0.005 or 0.5%, the risk of a false alarm should be at most 0.001, which corresponds to 3.1 standard deviations. In this example, the multiplier value M is calculated according to the formula:

$$M = \frac{s^2 \cdot (1+b)}{b^2}. \qquad (6)$$

Using the values of Table I as an example, the multiplier value M would be 19.2. In practice, the value M=20 is selected to obtain a significance of over 3 standard deviations for disturbance of fN and ft). This means that a significance of approximately 1.3 standard deviation is accepted for frequencies of fR or fE.

Thresholds

As stated above, the value of the disturbance counter 26 at the end of a QOS measurement period is a Pi-distributed random variable. In other words, the disturbance-counting values X(i) follow a Pi-distribution with mean H·f, and peakedness F. When the bias b=0, i.e. f=fC, the disturbance threshold T is selected as T=H·fC.

When the bias b is not equal to zero, it is desirable that the expected value of X(i), E(X), to be s standard deviations away from T.

Then, E(X)=T·(1+b).

The variance of X(i), V(X)=T·F·(1+b).

T-E(X)=-T·b=s·√(V(X))=s·√(T·F·(1+b)), and the disturbance threshold T is then given by:

$$T = \frac{s^2 \cdot F \cdot (1+b)}{b^2} = F \cdot M. \qquad (7)$$

This formula is the reason for the expression of the multiplier M given above, and since T was selected as H·fC, the base-event threshold H is given by:

$$H = \frac{T}{fC} = \frac{F \cdot M}{fC}. \qquad (8)$$

Now, the disturbance threshold T and the base-event threshold H for the Quotient algorithm are expressed in terms of peakedness F, multiplier value M and critical disturbance frequency fC; T=F·M and H=F·M/fC. Using the determined value of the critical disturbance frequency fC, the determined value of peakedness F and the selected multiplier value M, the base-event threshold H and the disturbance threshold T are determined as indicated by the formulas above and as indicated in steps 218 and 220, respectively.

Assuming that the peakedness F has been determined to be 5, the disturbance frequency fC 0.01 and that the multiplier value M has been selected to be 20, then the base-event threshold H is equal to 20·5/0.01=10000, and the disturbance threshold T is equal to 20·5=100.

Naturally, a smaller multiplier value M, such as 4, makes the algorithm react faster while the results are somewhat less reliable. The base-event threshold H would then be 2000 and the disturbance threshold T would only be 20.

Updating the Quotient Algorithm

In the next step, 222, the Quotient algorithm is updated by using the thresholds determined in steps 218 and 220. In step 224, the QOS measurements are continued using the updated Quotient algorithm.

The most important advantage of the invention is that QOS measurements using the refined thresholds determined in step 218 and 220 will generally provide meaningful results that justify the expense of designing them and putting them into operation. In general, this does not seem to be the case for prior art systems.

In some sense, the peakedness value F could be considered part of an overall multiplier which controls the reactivity and reliability of the Quotient algorithm. Such an overall multiplier would incorporate the multiplier value M and the peakedness value F. In the examples given above, the product of F and M forms an overall multiplier F times M, where F is a measure of the bursty behavior and M is a measure of statistical significance of the results.

In an alternative embodiment, the initial setting of the base-event threshold and the disturbance threshold in step 208 is also performed in accordance with the peakedness hypothesis. In other words, instead of setting the thresholds directly, based on experience and intuition, the thresholds are set by using estimates of expected disturbance frequency and peakedness, i.e. an initial value $fC_{init}$ of the critical disturbance frequency and an initial value $F_{init}$ of the peakedness. First, at least one initial value of the disturbance frequency is determined in circumstances that can be expected in operation of the physical process. This initial value or values includes an initial critical value $fC_{init}$ of the disturbance frequency where the monitoring nominally issues an alarm. It is normally sufficient to make an a priori guess or estimate based on earlier experience. Also, an initial value $F_{init}$ of the peakedness factor expected for the physical process is estimated at the initial critical value $fC_{init}$. Here also, it is sufficient to make an a priori guess or estimate. An initial value of the base-event threshold H is then set according to formula (8) above, and an initial value of the disturbance threshold T is set according to formula (7) above.

An Example—the Photocopier

For a better understanding of the invention, an example dealing with a malfunctioning photocopier following the steps of FIG. 5, will now be briefly described.

Many people have experienced the frustration of using a malfunctioning photocopier. Yet, normally, even a malfunctioning machine only fails sometimes, and not every time it makes a copy.

As a first step (202), the disturbance is defined to be a failure to make a copy. Or more exactly, failure means that the machine stops and gives an error code that requires manual intervention.

In the next step (204), the base event is defined to be an attempt to make a single copy of a single sheet. The QOS measurements are consequently event-based.

Next (206), the unit for disturbance frequency is defined as being the proportion or percentage of failed copying attempts.

Once the disturbance, the base and the unit with which to measure the disturbance frequency have been defined, initial thresholds for the Quotient algorithm are set in an initial configuration phase, also referred to as an initial design phase (208).

If the thresholds are initially determined directly by a priori estimates based on experience and intuition, H might have been chosen to be 100000 and T might have been chosen to be 80.

However, if the peakedness hypothesis is used in the initial setting of the thresholds, expected values of the disturbance frequency and the peakedness are estimated first. Based on earlier experience, in the form of records of how many manual interventions that have been necessary in a period of time and how many sheets that have been copied in the same period, the following illustrative values of frequency seem reasonable: fN=0.0004, fR=0.00064, fC=0.0008, fE=0.001 and fu=0.0016. A value of peakedness F=3 is chosen intuitively, on the basis that a photocopier often fails a couple of times in a short period, and then continues to function normally again. A multiplier value of 15 is selected. The initial base-event threshold H is determined as 15·3/0.0008=56250 according to formula (8) above, and the initial disturbance threshold is determined as 15·3=45 according to formula (7) above. By way of example, the configured Quotient algorithm is implemented in a microprocessor in the photo copier.

Next (210), the QOS measurements are put into operation. In other words, install the copying machine and start using it. Since, the base-event threshold H initially has been set to 56250, each QOS measurement period comprises 56250 base events, i.e. 56250 attempts to make a copy. The number of counted disturbances in a measurement period is defined as a disturbance-counting value. Additionally, if the alarm function is enabled at this point, an alarm will be raised if the number of disturbances reaches the disturbance threshold T=45 within the measurement period.

When a set of QOS measurements has been performed, the disturbance-counting values are analyzed by the control function, and the disturbance frequency fC (212) and the peakedness F (214) are determined by using an average algorithm that processes the disturbance-counting values. For the purposes of this example, assume that the critical disturbance frequency fC is determined to be 0.001, and that the peakedness F is determined to be 2.4.

In the next step (216), a multiplier value M is selected by way of a risk table similar to the one shown in Table I above. For example, the multiplier value M is selected as 20.

Consequently, in the next steps (218, 220) the adjusted value of the base-event threshold H is determined to be 20·2.4/0.001=48000 and the adjusted value of the disturbance threshold T is determined to be 20·2.4=48.

The Quotient algorithm is updated (222) based on the adjusted thresholds, and the QOS measurements are continued (224) using the updated algorithm. Preferably, now is the time to enable the alarm function and start the real monitoring of the disturbances in the copying machine. Each QOS measurement period is equal to 48000 base events, i.e. 48000 attempts to make a copy. The control function (28 in FIG. 2) will instruct the alarm function (30) to raise an alarm when the number of disturbances reaches the disturbance threshold T=48 within the measurement period. The current thresholds will most likely give satisfactory results. However, if there is a clear problem with false positives or false negatives, then the multiplier M may have to be adjusted as explained above.

In Table II below, a comparison is made between the initial thresholds estimated directly, the initial thresholds estimated using the peakedness hypothesis based on a priori guesses, and the adjusted thresholds determined using the peakedness hypothesis based on acquired disturbance-counting values.

| Initial thresholds estimated directly | Initial thresholds using peakedness hypothesis | Adjusted thresholds using peakedness hypothesis |
|---|---|---|
| 100000 | 56250 | 48000 |
| 80 | 45 | 48 |

It must be understood that the values of the thresholds in this example are not generally applicable to copying machines. Instead, the complete procedure of FIG. 5 has to be followed with consideration to the particular machine that is used.

Although the above example related to a copying machine or a photocopier, it should be understood that the invention is applicable to other machines and other physical disturbance processes. In particular, the invention is intended for automatic monitoring of disturbances within modem telecommunications and datacommunications.

Third Preferred Embodiment

Since the disturbance frequency and the peakedness value relate to the disturbances of the physical process and not to the particular algorithm that controls the monitoring of the disturbances, the disturbance frequency and the peakedness value determined by using the Quotient algorithm can be used to set the parameters for other monitoring algorithms, such as the Leaky Bucket algorithm.

Figure 6:
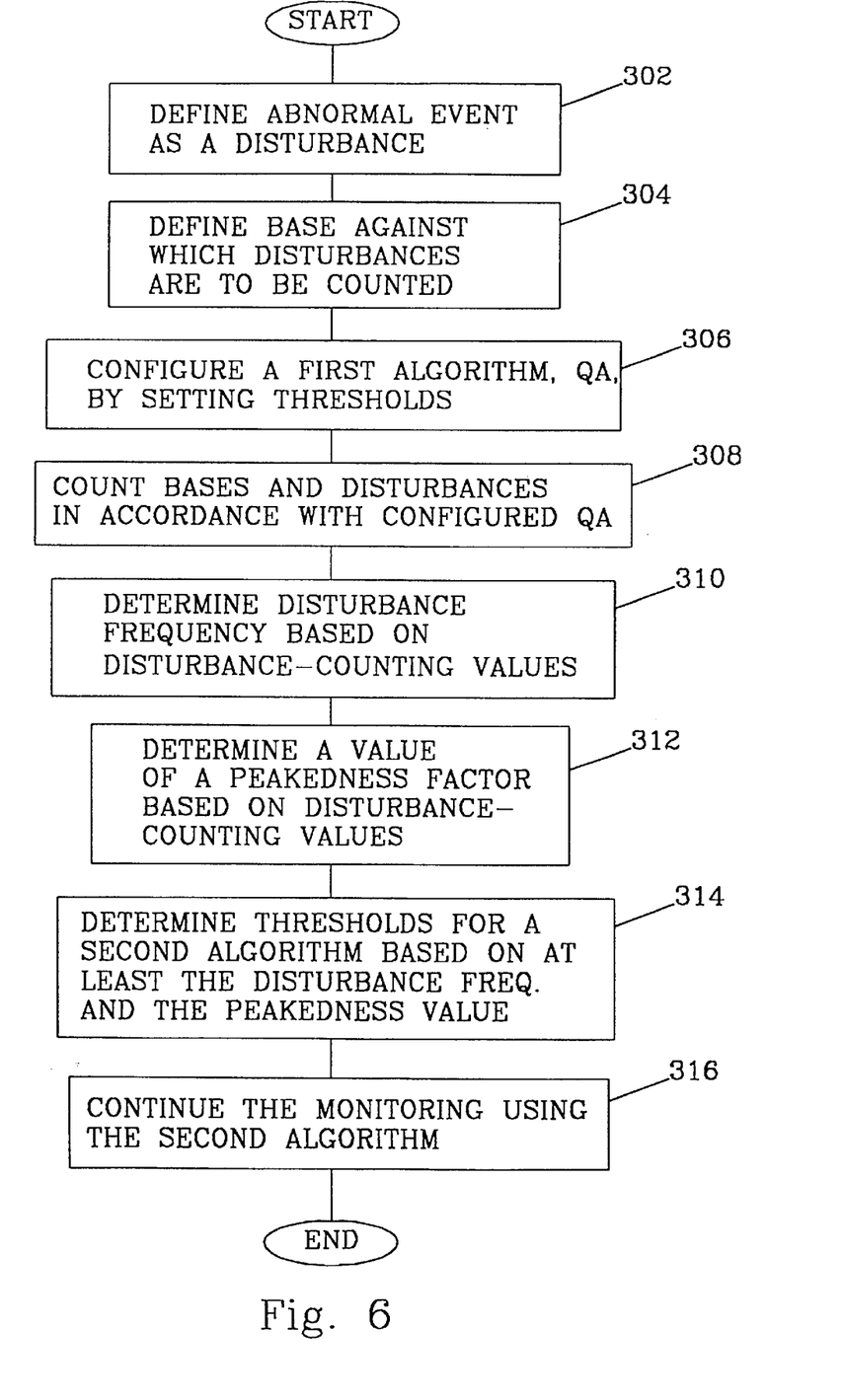
FIG. 6 is a schematic flow diagram of a third preferred embodiment of a method for performing monitoring of disturbances in a physical process.

FIG. 6 is a schematic flow diagram of a third preferred embodiment of a method for performing monitoring of disturbances in a physical process. A first step 302 is to define the abnormal event that is regarded to be a disturbance. The next step, indicated at 304, is to define a base against which the disturbances are to be counted. In step 306, a first monitoring algorithm, the Quotient algorithm, is configured by setting a base-event threshold H and a disturbance threshold T. It is sufficient to make an a priori guess or estimate of the thresholds based on experience and intuition. Next, in step 308, the disturbances of the physical process are monitored by counting base events and counting disturbances in accordance with the Quotient algorithm. In step 310, at least one value of the disturbance frequency of the physical process is determined based on disturbance-counting values acquired in the monitoring. In step 312, a value of a peakedness factor defined as the ratio of the variance to the mean of occurrences of disturbances is determined based on disturbance-counting values acquired in the monitoring. A disturbance-counting value is defined in the same manner as above. The disturbance frequency and the peakedness are determined by using an averaging algorithm as described above in connection with FIG. 5. Peakedness is used as a measure of how bursty the disturbances are. In step 314, thresholds for a second monitoring algorithm are determined based on at least the determined disturbance frequency and the determined peakedness value. In step 316, the monitoring is continued using the second algorithm.

It is also possible to adjust the thresholds of the first algorithm as well, based on at least the disturbance frequency value and the peakedness value, and continue the monitoring using the first algorithm together with the second algorithm.

Preferably, the second monitoring algorithm is the Leaky Bucket algorithm. The Leaky Bucket algorithm is well known, and a description of the Leaky Bucket algorithm can be found, for example in U.S. Pat. No. 5,377,195.

System Implementations

The control function 28 (FIG. 2) of the monitoring function 20, and the alarm function 30 are preferably implemented in software executing in a processor. The processor may e.g. be the APZ-processor in the Ericsson AXE system. The processor may of course use a memory and other conventional auxiliary devices such as appropriate interfaces, keyboards and displays. The control function 28, also referred to as a control unit, basically comprises two subfunctions: the monitoring algorithm function (Quotient and/or Leaky Bucket algorithm), and the statistics function. By statistics function is meant the functional block that processes the disturbance-counting values, determines values of disturbance frequency and peakedness according to an averaging algorithm, and determines adjusted thresholds.

Alternatively, the control function 28 and the alarm function 30 are implemented in hardware such as an ASIC (Application Specific Integrated Circuit). For example, the known programming language VERILOG and the known synthesizing program SYNOPSYS could be used. The functionality of the control function 28 is defined in a program written in VERILOG, and the synthesizing program SYNOPSYS transforms the VERILOG program into a hardware network of gates and flip-flops.

In the following, illustrative guidelines for implementing the counters will be given.

Event-based Disturbance Process

In this case, both the base-event counter and the disturbance counter are implemented as straightforward counters, sometimes known as peg counters. The pseudocode for the Quotient algorithm given below relates to an event-based disturbance process.

Time-based Disturbance Process

In this case, the disturbance counter is implemented as a peg counter. However, it is not realistic to have a base-event counter that steps up at regular intervals many times (thousands of times) per second. Instead, the base-event threshold H is selected to correspond to a suitable length of time, say one minute. If, for example, base events occur 8000 times per second, as usual in modern digital transmission systems, then the value of H is 60·8000=480000. If the disturbance counter exceeds the disturbance threshold T in that period, then an alarm is raised.

Artficial-based Disturbance Process

This case is similar to the case of a time-based disturbance process in that an explicit disturbance counter and an implicit base-event counter are used.

Suppose a base event is defined to be one erlang-second of traffic. Then a suitable value of the base-event threshold H could be say 360000, corresponding to 100 erlang-hours, which is the measurement period.

The base-event counter is then implemented in a type of counter sometimes known as an accumulator that records the traffic volume measured in erlang-seconds, -minutes or -hours.

If the disturbance counter exceeds the disturbance threshold T in the measurement period, then an alarm is raised or a notification sent.

The above guidelines for counter implementations are not exhaustive. There exists yet further possibilities, for example, using a type of counter known as a thresholded peg counter. It is however important to appreciate that the base events can be counted implicitly, especially when it is unrealistic to count them explicitly.

EXAMPLE OF PSEUDOCODE FOR THE QUOTIENT ALGORITHM

Below, an example of a schematic pseudocode for the Quotient algorithm function will be briefly described. The given pseudocode relates to an event-based disturbance process and is easily implemented in software executing in hardware, or implemented directly in hardware.

>>>Initialize>>>
  Instantiate the base-event counter and set it to zero;
  Set base-event threshold H;
  Instantiate the disturbance counter and set it to zero;
  Set disturbance threshold T;
  Return.
>>>Detection of base event>>>
  Interface the physical process;
  Detect a base event;
  Send Increment_base-event_counter;
  Return.
>>>Detection of disturbance>>>
  Interface the physical process;
  Detect a disturbance;
  Send Increment_disturbance_counter;
  Return.
>>>Increment base-event counter>>>
  Add one to base-event counter;
  If base-event counter<H then Return;
  Send Value_of_disturbance_counter_for_statistics;
  Reset both counters;
  Return.
>>>Increment disturbance counter>>>
  Add one to disturbance counter;
  If disturbance counter<T then Return;
  Send Alarm;
  Return.
>>>Alarm>>>
  Do actions on alarm (dependent on implementation and application);
  Send Degraded_instance;
  Return.
>>>Value of disturbance counter for statistics>>>
  Do calculations according to averaging algorithm, formula (1) and (3), and according to formulas (2), (5), (7) and (8);
  Return.

The embodiments described above are merely given as examples, and it should be understood that the present invention is not limited thereto. It is of course possible to embody the invention in specific forms other than those described without departing from the spirit of the invention. Further modifications and improvements which retain the basic underlying principles disclosed and claimed herein are within the scope and spirit of the invention.

What is claimed is:

1. A method for performing monitoring, controlled by a Quotient algorithm, of disturbances apt to occur at random or in bursts in a physical process, said method comprising the steps of:

defining an abnormal event regarded to be a disturbance;

defining a base against which disturbances are to be counted;

designing the Quotient algorithm by setting a base-event threshold H and a disturbance threshold T;

monitoring the disturbances of the physical process by counting base events, counting disturbances and using the Quotient algorithm to selectively raise an alarm;

determining for the physical process, a value F of a peakedness factor defined as the ratio of the variance to mean of occurrences of disturbances in the physical process based on the disturbance-counting values acquired in the monitoring peakedness being used as a measure of how bursty the disturbances are; and adjusting at least one of said base-event threshold H and said disturbance threshold T of said Quotient algorithm based on at least said value F of the peakedness factor.

2. A method for performing monitoring of disturbances according to claim 1, further comprising the step of determining a value f of the disturbance frequency of the physical process based on disturbance-counting values acquired in the monitoring, and said value F of the peakedness factor is determined at said value f of the disturbance frequency.

3. A method for performing monitoring of disturbances according to claim 2, wherein said adjusting step comprises the steps of:

determining an adjusted base-event threshold H based on at least said value f of the disturbance frequency and said value F of the peakedness factor;

determining an adjusted disturbance threshold T based on at least said value F of the peakedness factor.

4. A method for performing monitoring of disturbances according to claim 1, wherein the number of counted disturbances at the end of a predetermined period is defined as a disturbance-counting value.

5. A method for performing monitoring of disturbances according to claim 4, wherein the predetermined period is defined as the time it takes for the number of counted base events to reach the base-event threshold H, the number of counted base events and the number of counted disturbances being reset at the start of each predetermined period.

6. A method for performing monitoring of disturbances according to claim 4, wherein said step of determining a value F of the peakedness factor is performed under the assumption that the disturbance-counting values are Pi-distributed, and that the peakedness of the Pi-distribution of the disturbance-counting values, being used as the value F of the peakedness factor for the physical process, is determined by using an averaging algorithm.

7. A method for performing monitoring of disturbances according to claim 2, wherein said value f of the disturbance frequency is a critical value fC of the disturbance frequency at which the alarm nominally is raised.

8. A method for performing monitoring of disturbances according to claim 1, wherein the bursty behavior of the disturbances of the physical process is considered solely on the basis of the peakedness factor, together with the disturbance frequency.

9. A method for performing monitoring of disturbances according to claim 2, wherein the step of determining a value of the disturbance frequency, the step of determining a value of the peakedness factor and the step of adjusting at least one of said base-event threshold and said disturbance threshold are repeated during monitoring of the disturbances of the physical process.

10. A method for performing monitoring of disturbances according to claim 1, wherein said value F of the peakedness factor is part of an overall multiplier that controls the reactivity and reliability of the Quotient algorithm, said overall multiplier being used in the adjusting step.

11. A method for performing monitoring of disturbances according to claim 2, wherein further comprising the step of selecting for the Quotient algorithm a multiplier value M being a measure of how fast or slowly the algorithm is desired to react to changes in the disturbance frequency, so as to achieve an acceptable compromise between speed and reliability of said monitoring.

12. A method for performing monitoring of disturbances according to claim 11, wherein said multiplier value M is related to the statistical significance of the results of the monitoring, and the adjusted base-event threshold H is determined according to the following formula:

$$H = \frac{M \cdot F}{f};$$

the adjusted disturbance threshold T is determined according to the following formula:

$$T = M \cdot F.$$

13. A method for performing monitoring of disturbances according to claim 1, wherein said step of designing the Quotient algorithm by setting a base-event threshold and a disturbance threshold, in an initial phase comprises the steps of:

estimating at least one initial value of the disturbance frequency in circumstances that can be expected in operation of the physical process, said initial value or values including an initial critical value $fC_{init}$ of the disturbance frequency where the monitoring nominally issues an alarm;

estimating for the physical process, at said initial critical value $fC_{init}$, an initial value $F_{init}$ of the peakedness factor expected for the physical process; and setting said base-event threshold H based on at least said initial peakedness value $F_{init}$ and said initial critical value $fC_{init}$, and setting said disturbance threshold T based on at least said initial peakedness value $F_{init}$.

14. A method for performing monitoring of disturbances according to claim 1, wherein the step of defining a base comprises the step of determining the base as an artificial base, the outcome being a random variable able to take a value indicating normal event or disturbance.

15. A method for performing monitoring of disturbances according to claim 1, wherein it further comprising the step of defining a unit to be used as a measure of the disturbance frequency.

16. A method for performing monitoring of disturbances according to claim 1, wherein said physical process is a technical process in a communication system, and that the abnormal event defined to be a disturbance in the technical process is selected from the group consisting of a parity error, a sporadic hardware fault, a bit-correction error, a cyclic-redundancy-check (CRC) error, a congested call attempt, a synchronization slip, a protocol error, a signaling error in line or register signaling, a program exception during run-time, and a violation of the software contract at an interface.

17. A, system for monitoring disturbances in a physical process, said system comprising:

a disturbance counter for counting abnormal events regarded to be disturbances;

a base-event counter for counting occurrences of a base against which the disturbances are counted;

a control unit implementing a Quotient algorithm for controlling the monitoring of the disturbances of the physical process, the Quotient algorithm using a base-event threshold, a disturbance threshold and counter values obtained from said disturbance counter and said base-event counter to selectively raise an alarm, means for determining at least one value of the disturbance frequency of the physical process based on disturbance-counting values acquired in the monitoring;

means for determining for the physical process, a value of a peakedness factor defined as the ratio of the variance to mean of occurrences of disturbances in the physical process based on the disturbance-counting values acquired in the monitoring, peakedness being used as a measure of how bursty the disturbances are; and means for adjusting said base-event threshold of said Quotient algorithm based on at least said value of the disturbance frequency and said value of the peakedness factor, and for adjusting said disturbance threshold of said Quotient algorithm based on at least said value of the peakedness factor.

18. A method for performing an algorithm-controlled monitoring of disturbances apt to occur at random or in bursts in a physical process, said method comprising the steps of:

defining an abnormal event regarded to be a disturbance;

defining a base against which disturbances are to be counted;

configuring a first monitoring algorithm, a Quotient algorithm, by setting a base-event threshold and a disturbance threshold;

counting base events and counting disturbances in accordance with the Quotient algorithm, determining at least one value of the disturbance frequency of the physical process based on disturbance-counting values acquired in the monitoring;

determining for the physical process, a value of a peakedness factor defined as the ratio of the variance to mean of occurrences of disturbances in the physical process based on the disturbance-counting values acquired in the monitoring peakedness being used as a measure of the bursty behavior of the disturbances of the physical process;

determining threshold values for a second monitoring algorithm based on said value of the disturbance frequency and said value of the peakedness factor; and continuing the monitoring of the disturbances of the physical process using the second algorithm.

19. A method for performing monitoring of disturbances according to claim 18, wherein the thresholds of said first monitoring algorithm are adjusted based on at least said value of the disturbance frequency and said value of the peakedness factor, and the monitoring of the disturbances of the physical process is continued using the first algorithm together with the second algorithm.

20. A method for performing monitoring of disturbances according to claim 18, wherein the value of the disturbance frequency is a critical value of the disturbance frequency.

21. A method for performing monitoring of disturbances according to claim 18, wherein said second algorithm is the Leaky Bucket algorithm.

22. A method for performing monitoring of disturbances according to claim 18, wherein the number of counted disturbances at the end of a predetermined period is defined as a disturbance-counting value, the predetermined period being defined as the time it takes for the number of counted base events to reach the base-event threshold, the number of counted base events and the number of counted disturbances being reset at the start of each predetermined period.

* * * * *